May 1, 1928.
J. F. CARROLL
1,668,396
TEMPLATE
Filed Feb. 9, 1927
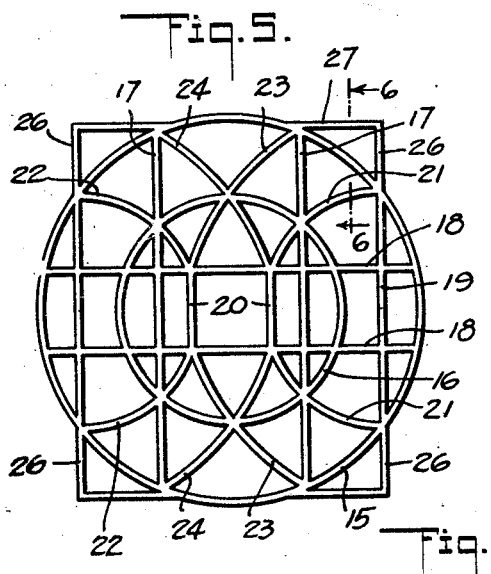
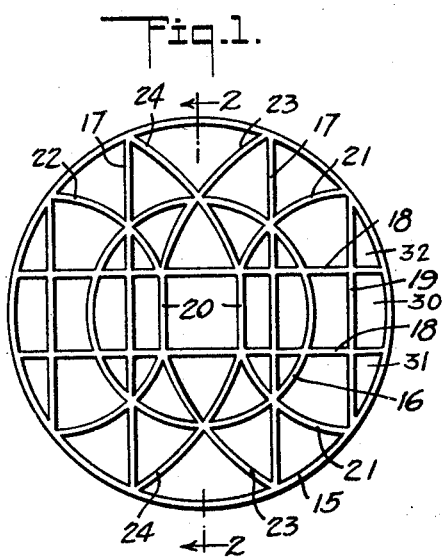
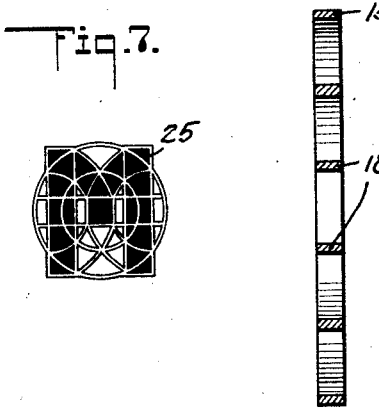
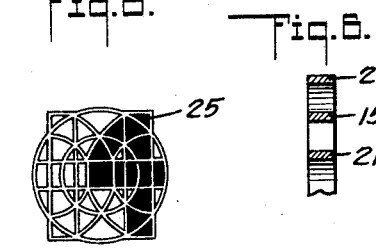
INVENTOR
JOSEPH F. CARROLL
BY
ATTORNEY Patented May 1, 1928.

1,668,396

UNITED STATES PATENT OFFICE.

JOSEPH F. CARROLL, OF DENVER, COLORADO.

TEMPLATE.

Application filed February 9, 1927. Serial No. 166,979.

My invention relates to and has for its purpose the provision of a template, stencil, pattern or guide possessing certain geometrical characteristics by which it is possible to form singly various characters, such as the several letters of the alphabet, the several digit numerals, and the punctuation marks used in writing or printing.

Further, it is a purpose of my invention to provide a unitary element of the character mentioned to enable a person to optionally produce graphically the characters specified hereinabove, without shifting the element from the surface on which the particular character is to be produced.

Further, it is a purpose of my invention to provide a template the outlines of which are part of a geometrical figure or character as a whole, and of any letter, numeral or mark formed therein so that the latter will appear proportionately correct to the eye and to enable the eye to quickly select a group of outlines that define the borders of any letter, numeral or mark.

I will describe only two forms of template embodying my invention, and will then point out the novel features thereof in claims.

In the accompanying drawing,

Figure 1 is a view showing in front elevation one form of template embodying my invention;

Figure 2 is a vertical sectional view taken on the line 2—2 of Figure 1;

Figures 3 and 4 are views similar to Figure 1, but on a reduced scale and showing one manner in which the template can be employed to form numerals and letters, respectively;

Figure 5 is a view similar to Figure 1 showing another form of template embodying my invention;

Figure 6 is a sectional view taken on the line 6—6 of Figure 5;

Figures 7 and 8 are views similar to Figures 3 and 4, showing one manner in which the template of Figure 5 can be employed to form letters and numerals, respectively.

My invention, in the embodiment shown in Figure 1, comprises a template made up of a plurality of partitions constructed of any suitable rigid material and permanently secured to each other in any suitable manner to maintain the definite form shown. The partitions may be constructed of strips of metal welded to each other, or they may be all cast in a single operation. In the present instance, the template is constructed of two circular partitions 15 and 16 concentrically arranged and connected by two straight-line partitions 17 which intersect the inner circle 16. A second pair of straight-line partitions 18 extend at right angles to the partition 17 and likewise intersect the inner circular partition 16. A third pair of straight-line partitions 19 intersect the partitions 18 at right angles, these partitions being relatively short and having their opposite ends connected to the outer circular partition 15. A fourth pair of straight-line partitions 20 connect the partitions 18 at a point within the circle 16 and between the partitions 17. Two pairs of arcuate partitions 21 and 22 extend from the opposite ends of the partitions 20 to the outer circular partition 15. The partitions of each pair 21 or 22 are struck from a common center and they are so disposed as to connect the ends of the partitions 19 and 20. The template is also provided with two other pairs of arcuate partitions 23 and 24, and the partitions of each pair are struck from the same center and extend from the opposite ends of one partition 20 to the outer circular partition 15 in a manner to connect the opposite ends of one partition 17 to the opposite ends of one partition 20.

The partitions arranged as just described provide intervening openings or pockets in which or behind which are adapted to be placed blocks, sheets of colored material or anything capable of completely filling or spanning any desired group of openings to form any desired letter, numeral or punctuation mark. It is desirable that the inserts 25 be of a color different from that of the edges of the partitions as illustrated in Figures 3 and 4, so that the character thus formed will stand out, while the remainder of the template appears as a highly artistic filigree background. It is important to note that the edges of the partitions defining the outlines or boundaries of a character are a part of the character as a whole, and being of a different color provides the advantage of producing a stenciled or cut effect, and thereby causing the character to appear proportionately correct to the eye. This illusionary design lends to any character formed within the template a shapely appearance which it would not have if made solid.

In Figures 5, 6, 7 and 8, I have shown another form of template embodying my invention which is identical to the form shown in Figure 1 with the exception that the partitions 19 are extended beyond the outer circular partition 15 as indicated at 26, and these extensions are connected to the outer circle at their outer ends by short partitions 27 disposed at right angles thereto and tangent to the circle.

This form of my invention is likewise adapted to receive inserts 25 within the openings between the partitions in the confines of the outer circle, as well as in the openings formed by the partitions 26 and 27, so as to produce numerals and letters as illustrated in Figures 7 and 8.

In either form of my invention, the template can be used as described to form any letter of the alphabet, any of the digit numerals, and any of the punctuation marks used in printing or writing. The manner in which letters may be produced is exemplified in Figs. 4 and 7. The manner in which numerals may be produced is exemplified in Figs. 3 and 8. It will be apparent from Fig. 1 that punctuation marks may be produced. For example, the opening 30 is available to produce a (.), the opening 31 is available to produce a (,), the openings 30 and 31 are available to produce a (;), and the openings 31 and 32 are available to produce a (:). Further it can be used as a stencil for the printing or painting of characters on surfaces, as in the making of signs, or it may be employed as an educational puzzle for children in teaching the different characters used in writing.

Although I have herein shown and described only two forms of templates embodying my invention, it is to be understood that various changes and modifications may be made therein without departing from the spirit of the invention and the spirit and scope of the appended claims.

I claim as my invention:

1. A template comprising two circular partitions concentrically arranged, a pair of straight-line partitions intersecting the inner circular partition and connected at their ends to the outer circular partition, a second pair of straight-line partitions at right angles to the first pair and intersecting the latter at points within the inner circular partition, a third pair of relatively short straight-line partitions intersecting the second pair at points exteriorly of the inner circular partition, a fourth pair of straight-line partitions connecting the second pair at points within the inner circular partition, two pairs of arcuate partitions with the partitions of each pair struck from a common center and extending, respectively, from one of the fourth pair of partitions to the outer circular partition at its point of connection with one end of one of the straight-line partitions of the third pair, and another two pairs of arcuate partitions with the partitions of each pair struck from the same center and extending, respectively, from one of the straight-line partitions of the fourth pair to the outer circular partition at the latter's point of connection with one end of one of the straight-line partitions of the first pair in such manner that the arcuate partition intersects the corresponding arcuate partition of the other pair where it crosses the inner circular partition.

2. A template as embodied in claim 1 wherein the straight-line partitions of the third pair are extended beyond the outer circular partition with short straight-line partitions connecting the ends of said partitions to the outer circular partition at a tangent thereto.

3. A template comprising two circular partitions concentrically arranged, and straight-line and arcuate partitions connecting the circular partitions in a manner to form openings between the circular partitions and within the inner circular partition.

4. A stencil consisting of a unitary element characterized by an arrangement of inter-connected portions and intervening spaces for optionally producing graphically each of the letters of the alphabet, each of the digital members, and the punctuation marks, without shifting the stencil.

JOSEPH F. CARROLL.